US005834671A

United States Patent [19]

Phoenix

[11] Patent Number: 5,834,671

[45] Date of Patent: Nov. 10, 1998

[54] WIRELESS SYSTEM FOR SWITCHING GUITAR PICKUPS

[76] Inventor: Philip S. Phoenix, 14 Fayette Rd. Apt. 241, South Burlington, Vt. 65403

[21] Appl. No.: 803,591

[22] Filed: Feb. 21, 1997

[51] Int. Cl.[6] .................................................. G09B 15/02

[52] U.S. Cl. ............................ 84/645; 84/746; 84/477 R

[58] Field of Search ............................ 84/609–614, 645, 84/646, 722–742, DIG. 30, 477 R, 478, 644, 746

[56] References Cited

U.S. PATENT DOCUMENTS

| | | | |
|---|---|---|---|
| 4,099,437 | 7/1978 | Stavrou et al. . | |
| 4,338,846 | 7/1982 | Pogoda . | |
| 4,711,149 | 12/1987 | Starr . | |
| 4,794,838 | 1/1989 | Corrigan, III | 84/478 X |
| 5,007,324 | 4/1991 | DeMichele | 84/477 R X |
| 5,136,919 | 8/1992 | Wolstein . | |
| 5,140,890 | 8/1992 | Elion . | |
| 5,245,128 | 9/1993 | Araiza . | |
| 5,296,641 | 3/1994 | Stelzel . | |
| 5,311,806 | 5/1994 | Riboloff . | |
| 5,414,209 | 5/1995 | Morita . | |
| 5,430,243 | 7/1995 | Shioda . | |
| 5,478,969 | 12/1995 | Cardey, III et al. . | |
| 5,561,257 | 10/1996 | Cardey, III et al. . | |
| 5,565,641 | 10/1996 | Gruenbaum . | |
| 5,576,507 | 11/1996 | LaMarra | 84/645 |

FOREIGN PATENT DOCUMENTS

| | | |
|---|---|---|
| 2-188796 | 1/1989 | Japan . |
| WO 87/00671 | 1/1987 | WIPO . |

*Primary Examiner*—Stanley J. Witkowski
*Attorney, Agent, or Firm*—Richard C. Litman

[57] ABSTRACT

A wireless system is provided for switching the pickups of a guitar. The system may work in conjunction with MIDI devices such as effects processors. The system includes a transmitter and a receiver. The transmitter receives input from the MIDI device via a DIN connector and generates a control signal which corresponds to a preselected combination of pickups which have been programmed and stored in memory. A second DIN connector is provided to function as a pass-thru. The pickup combinations stored in memory are associated with a program from the MIDI device. A display is provided to indicate to the musician which program is in current use. The receiver is positioned within the cavity of the guitar and includes a plurality of relays coupled to the pickups of the guitar. Based on the control signal received, the relays are activated in order to provide the selected pickup combination. A display, coupled to the receiver, is disposed on the surface of the guitar in order to inform the musician of the discrete state of each pickup. The system is also capable of providing dual humbucker pickup combinations.

7 Claims, 6 Drawing Sheets

WIRLESS SYSTEM FOR SWITCHING GUITAR PICKUPS

BACKGROUND OF THE INVENTION

1. Field of the Invention

The present invention relates to systems for controlling the output of musical instruments and more particularly to those systems suited for use with electric guitars. The invention is specifically related to a wireless system for automating the switching of guitar pickups.

2. Description of the Prior Art

Electric guitars are popular musical instruments capable of producing a wide range of sounds when used in conjunction with appropriate amplification devices. The electric guitar allows a musician to produce audio signals of varying volume and sound quality. In order to produce sound, guitars typically incorporate three pickups which are positioned beneath the metal strings thereof. The pickups are used to transform the mechanical vibrations of the metal strings into proportional analog signals.

Each pickup is typically composed of a single coil of wire having two wires connectable to a guitar output circuit. The output circuit is connected to an audio amplifying device via a shielded two conductor cable. The pickups are normally connected in parallel so that their analog signals can be added together. The analog signals are subsequently amplified and projected at the audience via speakers and other sound reproducing devices.

The pickup which is nearest the string anchor of the electric guitar is capable of picking up mostly the high frequency components of the vibration of the metal strings. This is due to the fact that the amplitude of the vibrations is reduced as the distance from the string anchor decreases. The pickup furthest from the string anchor, similarly, is capable of picking up more of the low frequency components of the string vibrations. The pickup positioned midway of the string anchor picks up more of the midrange components of the string vibrations.

Since the pickups are each better suited for picking up different frequency components of the mechanical vibrations of the metal strings, it is often desirable to select various combinations of the pickups for producing different musical effects. These combinations are achieved by electrically switching various pickups in and out using discrete on/off switches. The electrical switching, however, must be done quickly and accurately so that it is visibly and audibly unnoticeable to the audience. This can often prove to be a challenge because the musician must remove his hand from the guitar strings in order to switch the pickups. If not precisely timed and executed, switching the pickups will often result in disruption of the melody being played.

Traditional electric guitars are often provided with a five position switch which allows the selection of one of three pickups, or a combination of two adjacent pickups, for example neck 62 and mid 64, or mid 64 and bridge 66. FIG. 6 illustrates the pickup switching system utilized by such guitars. The guitar 60 includes a neck pickup 62, a mid pickup 64, and a bridge pickup 66. A five position switch 61 is used to select the desired pickup or combination of pickups, and direct the output to an output jack 68. The guitar 60 may also be provided with a two position button 69 for placement into dual humbucker mode. A major disadvantage of such systems is that a musician cannot select the combinations of neck 62 and bridge 66; neck 62 mid 64 and bridge 66, or all pickups off unless the guitar 60 is rewired to accept three discrete on/off switches. Each of these discrete switches is then hard wired into the pickup wiring and connected in series with the wires coming from each of the pickups. Thus, by flipping any of the discrete switches, the musician can electrically switch any individual pickup in or out of the guitar output circuit.

There are several noticeable disadvantages inherent in the use of discrete hard wired switches. First, the selection of a desired combination of pickups can require excessive time because as many as three switches may need to be adjusted in order to obtain certain combination. Second, the musician is likely to activate the wrong switches due to focus on playing the strings. Finally, discrete switches tend to produce a noticeable transient signal, or "click", in the output circuit when turned on or off. Thus drawing attention to the musician's selection of different pickups.

In an attempt to alleviate some of the aforementioned drawbacks, the prior art discloses various systems and apparatus for simplifying the control of electric guitars and other musical instruments. For example, U.S. Pat. No. 4,099,437 issued on Jul. 11, 1978 to Stavrou et al. discloses a musical instrument which includes a portable transmitter unit, a receiver unit, and a keyboard device. The transmitter includes circuitry for scanning the keys and auxiliary switches. The receiver unit decodes the transmitted pulse train, eliminates erroneous data, and generates output signals to control the corresponding keys and auxiliary functions.

U.S. Pat. No. 4,338,846 issued on Jul. 13, 1982 to Pogoda discloses a remote control unit for electronic musical instrument equipment. The unit includes a manually operated switch located on an electric guitar which controls a remotely located tuning device through the existing guitar cable. Circuitry associated with the switch is used to send a control signal on the audio cable, while circuitry located adjacent the tuner interprets the control signal for controlling the tuner.

U.S. Pat. No. 4,711,149 issued on Dec. 8, 1987 to Starr and PCT Application # WO 87/00671 published on Jan. 29, 1987 both disclose an electric guitar having at least two pickups for transforming string vibrations into corresponding electrical signals which are added together. A one touch switch apparatus including plural discrete switches and an encoder are provided to selectively combine the outputs of the pickups thereby reducing the number of switch actuations necessary for selecting a desired combination and providing ease in play.

U.S. Pat. No. 5,136,919 issued on Aug. 11, 1992 to Wolstein discloses a guitar pickup and switching apparatus. The apparatus includes active circuitry which provides improvements in pickup sound combination, hum rejection, and overall electronic function. The circuit employs plural pickups, a selected combination of which may be activated by a rotary switch. A latching device controlled by the switch outputs is used to produce a combination of control outputs to energize selected FET switching devices and enable pickup signal outputs. Combined pickup signal outputs are then mixed and buffer amplified in a final output stage.

U.S. Pat. No. 5,140,890 issued on Aug. 25, 1992 to Elion discloses a guitar control system. The system uses multiple string processing channels for developing pitch and peak signals for multiple string vibrations. Pitch and peak data are multiplexed into a microprocessor which produces processed sound information on an address/data bus. MIDI input/output, analog input/output, and counter circuitry are interactively connected to the data bus so that the final audio processing may be derived from the analog output.

U.S. Pat. No. 5,245,128 issued on Sep. 14, 1993 to Araiza discloses a controller for musical effect units which enables control of an effect unit through the use of two touch buttons mounted on a guitar, or other instrument. The touch buttons form an input to a microprocessor which utilizes control software in order to interpret the sequential contacting of the buttons. The control software converts the sequential manipulation of the touch buttons into a selection criteria which is then transmitted to the effect unit in order to select a pre-programmed or pre-selected effect. The control software also allows the musician to adjust the sequence timing of the two touch buttons.

U.S. Pat. No. 5,296,641 issued on Mar. 22, 1994 to Stelzel discloses a system for communicating between the infrared (IR) and MIDI domains. The system receives and subsequently transforms or transceives signals between the MIDI domain and the IR domain. The MIDI devices are cable connected to a transceiver which translates the MIDI signals into selected IR signals for operating IR devices. A computer may be connected to the transceiver through the MIDI interface in order to operate IR devices. The transceiver can also control the operation of selected devices as a result of IR signals presented to its IR input.

U.S. Pat. No. 5,311,806 issued on May 17, 1994 to Riboloff discloses a guitar pickup system for selecting from multiple tonalities. The system is designed for use in conjunction with an electric guitar using bridge and fingerboard humbucker pickups and an intermediate pickup. The system is capable of providing ready selection of distinct groups of Gibson tonalities and Fender tonalities. A four pole, five position switch for tone selection is used in conjunction with a double pole, double throw switch in order to provide selection of one-of-ten tonalities.

U.S. Pat. No. 5,414,209 issued on May 9, 1995 to Morita discloses an electronic musical instrument which includes keyboard operators for generating musical data; panel operators for generating tone control data; memory means for storing tone control data; switch means for changing a normal mode to an interrupt mode; and control means for writing the tone control data to the memory means when in the normal mode. A tone generator is used to produce a tone signal based on the keyboard data and tone control data stored in the memory means. Transmission data is generated according to tone control data and subsequently transmitted outside the electronic musical instrument.

U.S. Pat. No. 5,430,243 issued on Jul. 4, 1995 to Shioda discloses a sound effect-creating device for imparting a sound effect to a musical tone. The device delays the musical tone signal of an analog or digital type by a predetermined delay time in order to repeatedly generate the musical tone. The predetermined time delay is set based on a basic delay time determined from the period of a timing clock of a MIDI signal received from an external musical instrument. The period of the timing clock of the MIDI signal may also be determined from a basic delay time set for determining the predetermined delay time.

U.S. Pat. No. 5,478,969 issued on Dec. 26, 1995 and U.S. Pat. No. 5,561,257 issued on Oct. 1, 1996, both to Cardey, III et al. disclose a control system for a musical instrument such as a guitar. The system is programmable so that a tremolo characteristic can be applied to the audio signal produced by the musical instrument. The tremolo characteristic can be a combination of three preset amplitude components and three preset frequency components. The control system includes a tactile member which produces a signal proportional to pressure exerted on the tactile member by the musician. This signal can be used to dynamically vary the volume characteristic of the audio signal produced by the musical instrument.

U.S. Pat. No. 5,565,641 issued on Oct. 15, 1996 to Gruenbaum discloses a relativistic electronic musical instrument. The instrument preferably contains a microprocessor-based MIDI controller which receives signals from a standard computer keyboard as input and processes the signals to reproduce music. The system uses a calculation, wherein keypresses indicate diatonic interval changes in pitch value rather than absolute pitch values, in order to convert signals generated by the sequence of keystrokes into musical tones on an external synthesizer via the MIDI protocol. Relative key signature changes and changes of the base scale are accomplished with the touch of a button or foot pedal. Tone rows can be created and played back, and harmonic configurations can be selected while playing. The instrument also allows the user to custom design his or her own keyboard layout and scale configurations.

None of the above inventions and patents, taken either singly or in combination, is seen to describe the instant invention as claimed.

SUMMARY OF THE INVENTION

Accordingly, it is a principal object of the invention to provide a wireless pickup switching unit for electric guitars.

It is another object of the invention to provide a wireless system for automatically switching guitar pickups according to selected programs.

It is an object of the invention to provide improved elements and arrangements thereof in an apparatus for the purposes described which is inexpensive, dependable and fully effective in accomplishing its intended purposes.

In accordance with the objects of the invention, a wireless pickup switching unit is provided for use with electric guitars. The unit includes a transmitter and a receiver. The transmitter is remotely located and used to transmit a control signal. The transmitter allows a musician to create and store a plurality of programs, or effects variations, in memory. A display is provided to indicate to the musician which program is in current use. The transmitter is used to generate a control signal in response to a program selection and transmit the control signal to the receiver. The receiver is positioned within the cavity of the guitar and includes a display to inform the musician of the status of each pickup. A plurality of relays are coupled to the guitar pickups so that upon receipt of the control signal, the receiver may activate various relays in order to obtain a desired combination of pickups.

In accordance with another object of the invention, a wireless system is provided for switching the pickups of a guitar. The system is designed to work in conjunction with other MIDI (Musical Instrument Digital Interface) devices such as effects processors, and includes a transmitter and a receiver. The transmitter receives input from a standard MIDI device such as the effects processor previously mentioned. The transmitter generates a control signal corresponding to a predetermined combination of pickups. The transmitter includes a first DIN connector for receiving information from the MIDI device, and a second DIN connector for passing the signal from the MIDI device.

The transmitter allows a musician to select a plurality of desired pickup variations and store them in memory. Each pickup combination stored in memory is associated with a program from the MIDI device. A display is provided for indicating which program is in current use. The transmitter uses a Frequency Shift Key (FSK) processor in order to generate the control signal in response to a program selection and transmit the control signal to the receiver.

The receiver is positioned within the cavity of the guitar and includes an FSK decoder in order to interpret the control signal received from the transmitter. The receiver includes a plurality of relays coupled to the pickups of the guitar. Receiver control circuitry also is provided in order to switch the relays in response to the control signal received. The relays, in turn, force the pickups to occupy a discrete state which is selected from a predetermined number of possible discrete states. A receiver display is disposed on the surface of the guitar in order to inform the musician of the discrete state of each pickup. The system is also capable of providing dual humbucker pickup combinations.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
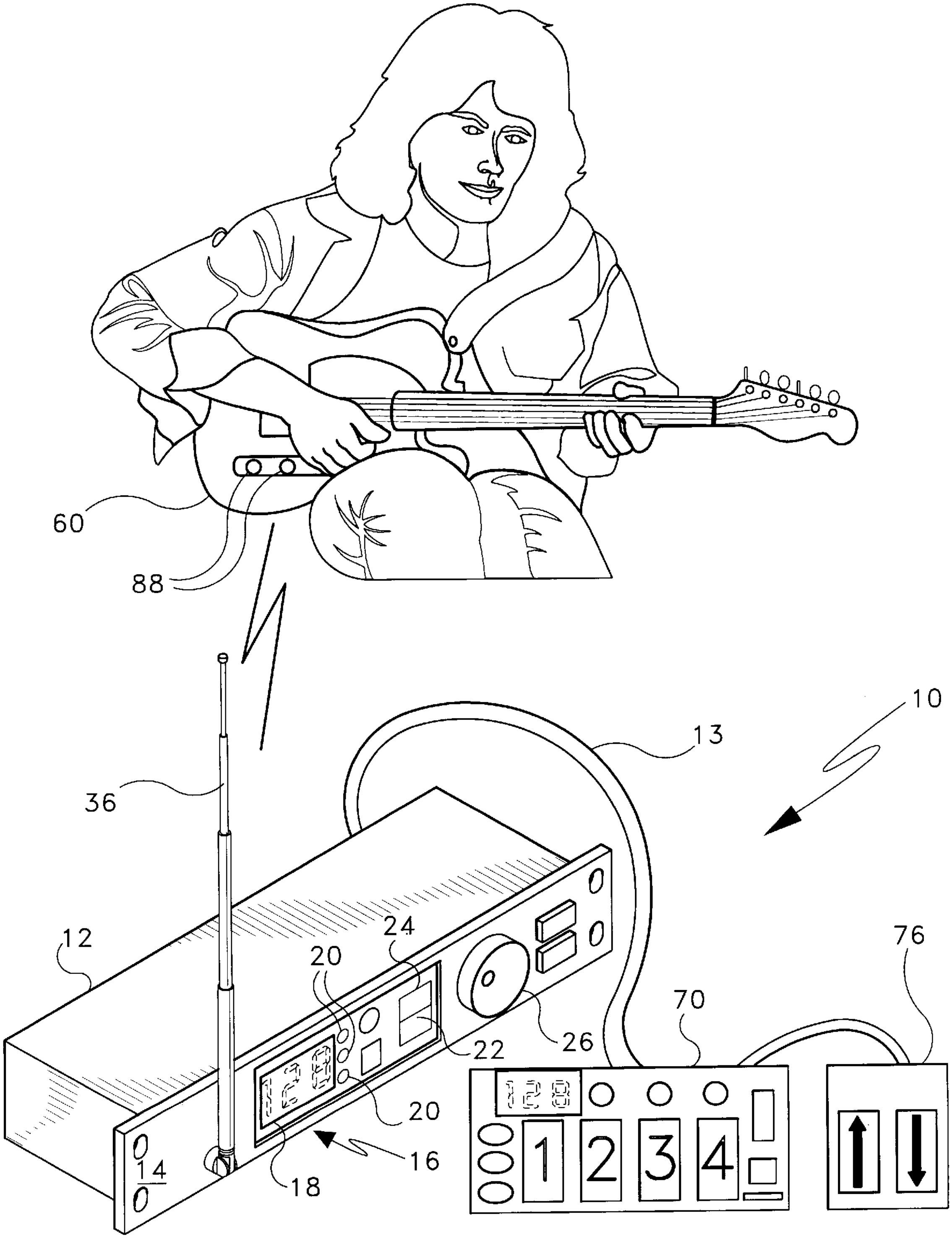
FIG. 1 is a perspective environmental view of a wireless pickup switching system in accordance with the present invention.
Figure 2:
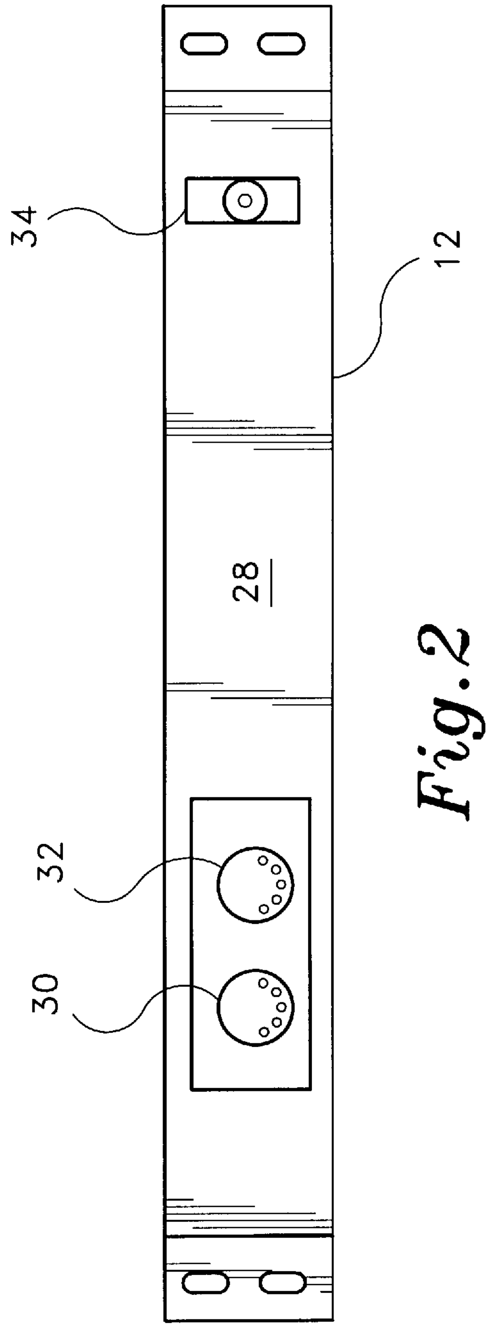
FIG. 2 is a rear elevational view of the transmitter.
Figure 4:
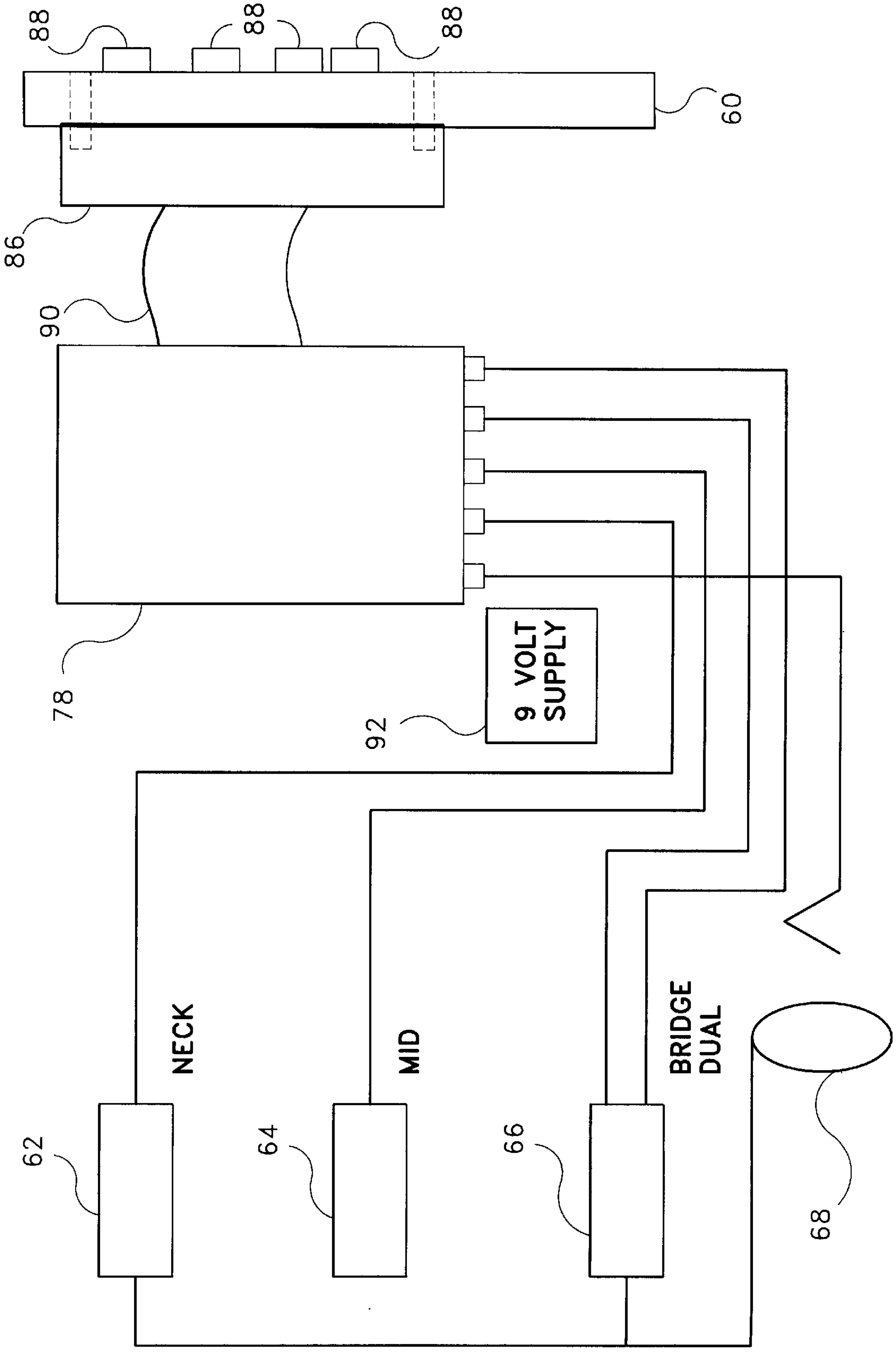
FIG. 4 is a schematic diagram illustrating integration of the receiver with the guitar.

With reference to the drawings and initially to FIGS. 1 and 2, a wireless system 10 is shown for switching the pickups of an electric guitar 60. The system 10 is capable of working in cooperation with one or more auxiliary MIDI devices 70. The system 10 includes a transmitter 12 and a receiver 78 (FIG. 4). The transmitter 12 is designed so that it may be mounted on standard sized audio/video rack mounts, and includes a front surface 14 and a rear surface 28. The transmitter 12 is used to produce a control signal corresponding to a predetermined combination of pickups. The pickup combinations available may be programmed into the transmitter 12 and stored in memory such as non-volatile RAM using a variety of control buttons disposed on the front surface 14 thereof. A program knob 26 is used to identify specific programs while a selection button 24 is used to select the desired pickup combination. A display 16 is used to provide the musician with various information concerning the state of the system 10. The display 16 includes a three digit LED screen 18 for providing visual identification of the selected program. The display 16 also includes a plurality of auxiliary lamps 20 for providing information concerning the current pickup combination being used. When the musician depresses the selection button 24, the transmitter 12 cycles through all of the various possible combinations of pickups and identifies which pickups are on or off via the auxiliary lamps 20. Once the desired pickup combination is found, it becomes associated with the program number displayed on the LED screen 18.

The transmitter 12 also allows the musician to place the guitar 60 in dual humbucker mode and select desired pickup combinations through the use of a dual switch 22. The dual switch 22 is a two state switch which is used to enable or disable the second coil of a dual humbucker bridge pickup. An auxiliary lamp 20 is also provided for visually indicating if the transmitter 12 is in the single or dual humbucker mode. The rear surface 28 of the transmitter 12 includes a first DIN connector 30 which is used to receive input from the MIDI device 70 via appropriate cabling 13. A second DIN connector 32 is used as a MIDI pass-thru for directing the signal from the MIDI device 70 to a subsequent device. The rear surface 28 is also used to connect a power supply to the transmitter 12. In preferred embodiments of the invention, the MIDI device 70 is provided with a foot controller 76 so that the musician may easily select a program. Alternatively, the selection of programs could be handled remotely by a stage technician.

Figure 3:
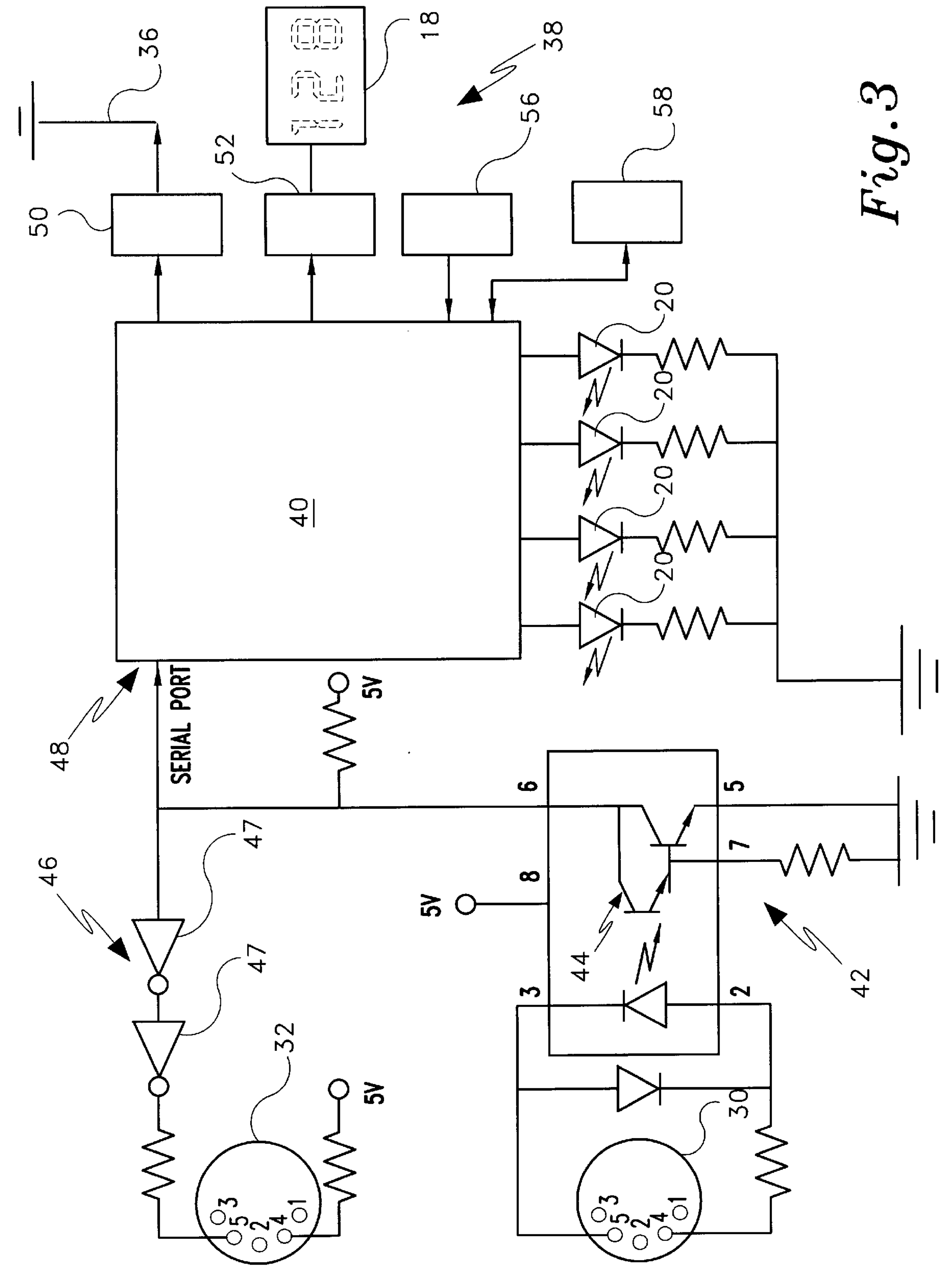
FIG. 3 is a schematic diagram of the transmitter circuitry.

Transmitter control circuitry 38 is disposed within the transmitter 12 for controlling its operation. A circuit diagram of the transmitter control circuitry 38 is shown in FIG. 3. The heart of the transmitter control circuit 38 is a micro-controller 40 which is used to manage the operation of the transmitter 12. The first DIN connector 30 is coupled to an optoisolator circuit 42. The optoisolator circuit 42 is used in order to reduce electrical noise and feedback which may be present in the line and could interfere with the operation of the transmitter 12. The optoisolator circuit 42 utilizes a photo-sensitive transistor 44 which is activated by light received from a diode. The optoisolator circuit 42 is also coupled to the second DIN connector 32 via a delay circuit 46 and to the micro-controller 40 via a serial port 48 containing appropriate Universal Asynchronous Receiver Transmitter (UART) circuitry. The delay circuit 46 incorporates a pair of inverters 47 and a resistor which are appropriately selected in order to buffer and protect the micro-controller 40 from unexpected spikes. The transmitter control circuit 38 includes an FSK processor 50 for generating the control signal. The FSK processor 50 is coupled to the micro-controller 40. The FSK processor 50 is also coupled to the antenna 36 of the transmitter 12 in order to broadcast the control signal. The LED screen 18 is operated by a display controller 52 which is coupled to the micro-controller 40. The buttons and switches used to program and operate the transmitter 12 are electrically coupled to the micro-controller 40 via an input interface 56. Once a particular pickup combination is programmed, the micro-controller 40 stores information pertaining to the program in memory 58. In preferred embodiments of the invention, non-volatile memory is used so that the programs are retained even after the power is shut off. The micro-controller 40 is also coupled to the auxiliary lamps 20.

The receiver 78 is disposed internally of the guitar 60 and wired to the pickups 62, 64, 66 as seen in FIG. 4. The receiver 78 is coupled to a receiver display 86 via a ribbon cable connector 90. The receiver display 86 is secured to the guitar 60 at a location proximate where a conventional pickup selection switch would be located. The receiver display 86 includes a plurality of LED lamps 88 which are correspondingly aligned with apertures on the guitar 60. The LED lamps 88 correspond to the various pickups available and are used to inform the musician of which pickups are currently active or inactive. For example, if the current pickup combination being used includes the neck and bridge pickups 62, 66, then the first and third LED lamps 88 would be energized. The receiver 78 may also include an auxiliary power supply 92 for use in conjunction with passive pickups.

Figure 5:
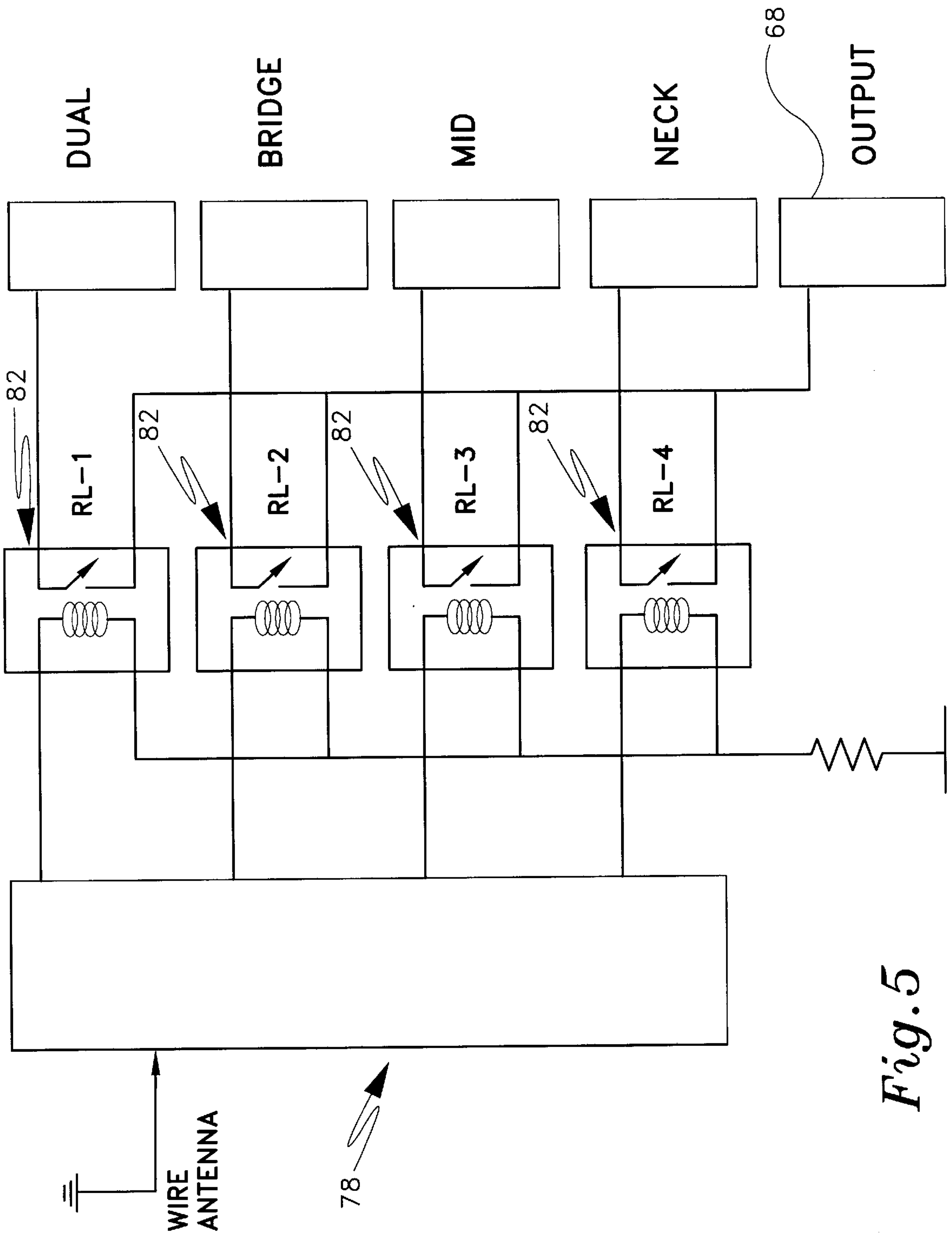
FIG. 5 is a schematic diagram of the receiver circuitry.
Figure 6:
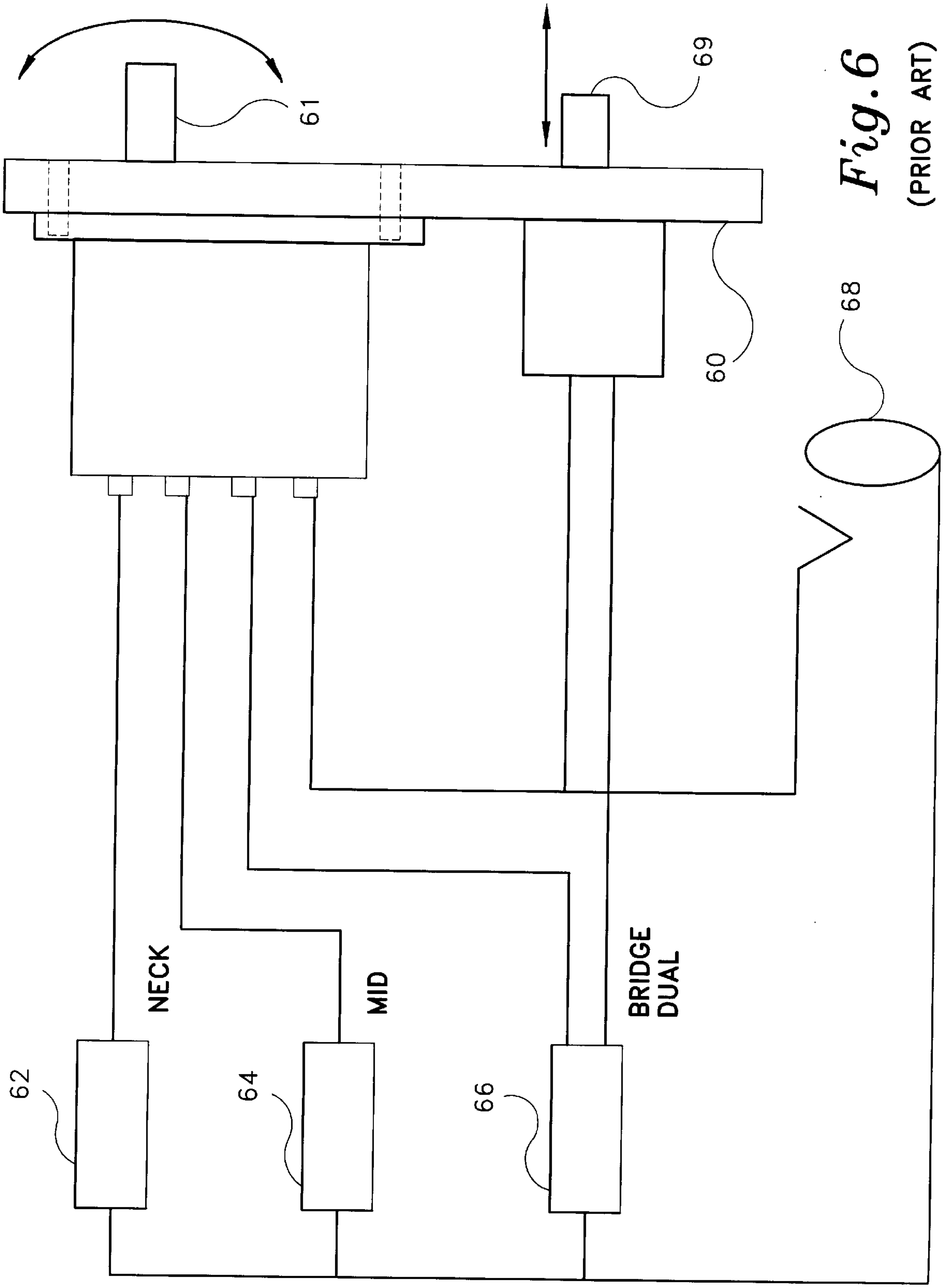
Fig.6 (PRIOR ART)
FIG. 6 is a schematic diagram illustrating a pickup switching system of the prior art.

As seen in FIG. 5, an FSK decoder 82 is provided for controlling the selection of pickups in accordance to the control signal received. The FSK decoder 82 is coupled to a plurality of relays RL-1, RL-2, RL-3, RL-4, each of which are in turn coupled to a corresponding pickup and with RL-4 being coupled to the second coil in a dual humbucker pickup. When the FSK decoder 82 receives the control signal from the transmitter 12, it interprets it and activates the appropriate combination of relays. The relays, in turn, force the pickups to occupy a discrete state which is selected from a predetermined number of possible discrete states, such as on and off. The relays are also coupled to an output jack 68 of the guitar 60 in order to direct the sound to an appropriate amplification system.

It is to be understood that the present invention is not limited to the sole embodiment described above, but encompasses any and all embodiments within the scope of the following claims.

I claim:

1. A wireless system for switching the pickups of a guitar comprising:

a remotely located MIDI device having stored therein a plurality of programs corresponding to pickup combinations;

a foot controller coupled to said MIDI device for selecting a program corresponding to a selected pickup combination;

a remote transmitter coupled to said MIDI device for sending a control signal indicative of the selected pickup combination, said transmitter including:

a transmitter control circuitry, detection means associated with said control circuitry for identifying said selected program, display means for visually indicating the identification of said selected program; and a receiver disposed within said guitar for receiving said control signal, said receiver including:

a plurality of relays, each electrically coupled to one of said pickups, decoding means responsive to said control signal for switching said relays to a discrete state indicative of the selected pickup combination, a receiver display electrically coupled to said receiver and disposed on the surface of said guitar.

2. A wireless system for switching the pickups of a guitar as recited in claim 1 wherein said receiver display includes a plurality of LED lamps, each corresponding to one of said pickups, for identifying the discrete state of said pickups.

3. A wireless system for switching the pickups of a guitar as recited in claim 1 wherein said transmitter circuitry comprises:

a. a micro-controller;

b. a first DIN connector for receiving input from said MIDI device;

c. an optoisolator circuit operatively coupled to said first DIN connector;

d. a second DIN connector for passing the signal from said MIDI device to an auxiliary device;

e. means for coupling said optoisolator circuit to said second DIN connector;

f. means for coupling said optoisolator circuit to said micro-controller.

4. A wireless system for switching the pickups of a guitar as recited in claim 1 wherein said display means comprises:

a. an LED display controller coupled to said micro-controller;

b. an LED display capable of displaying at least three digits, said LED display being coupled to said LED display controller; and c. a plurality of auxiliary lamps coupled to said LED display controller for indicating the discrete state of each pickup.

5. A wireless system for switching the pickups of a guitar as recited in claim 3 wherein said means for coupling said optoisolator to said micro-controller comprises a serial port containing UART circuitry.

6. The wireless system for switching the pickups of a guitar as recited in claim 1, wherein said decoding means comprises an FSK decoder.

7. The wireless system for switching the pickups of a guitar as recited in claim 1, wherein said transmitter includes an FSK processor for generating said control signal.

* * * * *